July 28, 1959     A. J. RYAN ET AL     2,896,453
FLOW METER
Filed Jan. 16, 1956
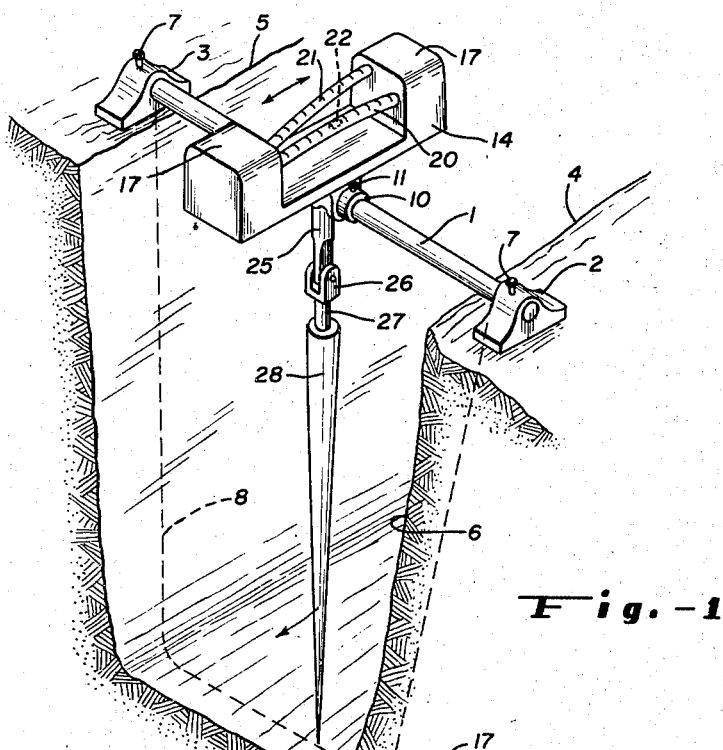
Fig.-1
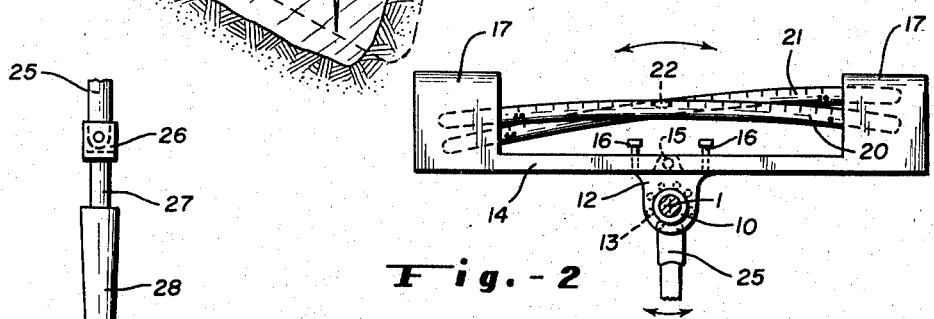
Fig.-2
Fig.-3
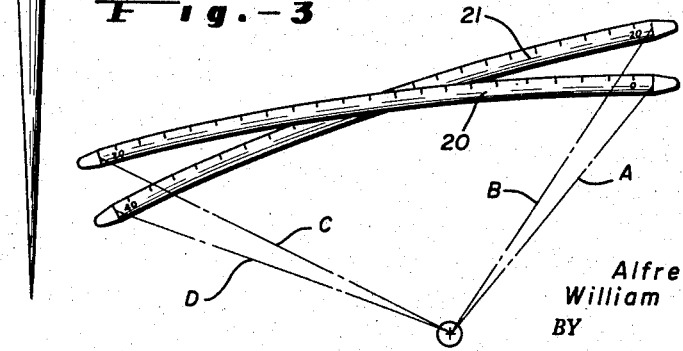
Fig.-4
INVENTORS
Alfred J. Ryan
William B. McDowell
BY
ATTORNEYS

United States Patent Office 2,896,453
Patented July 28, 1959

2,896,453

FLOW METER

Alfred J. Ryan, Denver, and William B. McDowell, Boulder, Colo.; said McDowell assignor to said Ryan Application January 16, 1956, Serial No. 559,427

6 Claims. (Cl. 73—228)

This invention relates to indicating mechanisms for physically movable mensuration apparatus, and more particularly to apparatus for measuring the flow of fluids through confined zones.

The flow of fluids through confined zones or conduits is not uniform due to currents, surges in flow, gradations in velocity throughout the cross-sectional area of the flow, various restrictions, and other like variations. This non-uniformity greatly reduces the accuracy of the instruments used in the measurement of the flow of such fluids, whether the instruments measure velocity, pressure, or total flow. Liquids, especially, are subject to deviations which have defied prior art attempts of accurately measuring the flow of liquids, through confined zones. In irrigated areas, for example, the accurate measurement of water in ditches and flumes is vitally important to the welfare of the local populace. However, water flowing in open flames has been variously measured for years with the accuracy of such measurement in error by as much as fifty percent or more. Even under ideal conditions and with the best flow meters available, accuracy within ten percent was rarely found. The surges and waves in the flumes requires mensuration calculations based on an average of indicated flow. This is actually only guessing, i.e. interpretation between the maximum and minimum fluctuations recorded by known measuring indicia. The flow of liquids, therefore, has been merely an estimate rather than an actual measurement of the flow.

In co-pending application Serial No. 451,582, filed August 23, 1954, now Patent No. 2,857,762, for Flowmeter, there is described a pendant vane measuring device which is interconnected to an indicating mechanism by means of a flexible joint. This flexible joint and pendant vane has substantially eliminated such flow effects on the vane as planing, buoyancy, waves and surges, striking the vane by entrained foreign matter and the like. However, large waves and surges and other large deviations are transmitted to the indicating mechanism, so that a damping means is required to reduce such extraneous motion and provide a more accurate measurement of the actual flow. Any damping means obviously increases the friction of the mechanism and the amount of force required to move the indicating mechanism, and, therefore, decreases the accuracy of the device. Further, the damping means increases the complexity of the mechanism and, further, increases the possibility of wear and the need of repair.

Many types of measuring equipment utilize the progressive movement of a motivated member to move an indicating member over a calibrated scale so that the movement of the motivated member can be measured in terms of a known quantity. Many extraneous deviations of normal movement of a motivated member reduce the accuracy of the measurement of the motion. A float, for example, for measuring dynamic liquid volume in a container, may be subject to variations due to waves, surges, and the like, and any degree of accuracy of measurement is only obtained by using damping means between the float and an indicator on a calibrated scale.

According to the present invention an indicating mechanism is provided for accurately indicating the progressive movement of a motivated member without indicating the extraordinary movements and forces over and above the real and actual movement desired to be measured. The indicating mechanism includes at least one elongated spirit level with a calibrated scale thereon mounted so as to move in conjunction with the motivating member to indicate only the desired movement thereof without measuring extraneous deviations of the movement. In one preferred form, an elongated spirit level is interconnected with a pendant vane mounted in a conduit for measuring the flow of liquid through the conduit.

Included among the objects and advantages of the present invention is the provision of an indicating mechanism for recording the progressive movement of a motivated member, which indicates substantially only the main force or forces moving the motivated member and does not measure the fluctuations due to obnormal and momentary deviations in the main force or forces. The invention, further, provides a spirit level calibrated meter for measuring the movement of a pendant vane suspended in a conduit and subject to the forces of a flow of fluid. The measuring device of the invention provides a simple, inexpensive and easily maintained device for measuring the flow of fluids in confined zones or conduits, and which does not indicate extraneous deviations due to waves, surges and the like in a moving stream of liquid.

These and other objects and advantages of the present invention may be readily ascertained by referring to the following description and illustrations in which:

Fig. 1 is a perspective view of an indicating mechanism according to the invention interconnected with a pendant vane, fluid-flow meter;

Fig. 2 is a side elevation of an indicating mechanism according to the invention;

Fig. 3 is a front elevation of a pendant vane according to the invention; and

Fig. 4 is a schematic diagram of the positioning of a pair of indicating members, according to the invention.

In the device selected for illustration in Fig. 1, a shaft 1 is secured to trunnions 2 and 3 mounted on banks 4 and 5, respectively, of an open ditch or flume 6. The shaft 1 is secured to the trunnions by means of set screws 7 which prevent rotation of the shaft in the trunnions. The flume 6 is of known cross-sectional dimensions at the point of mounting the shaft, as for example the line 8 which indicates in dashed lines the cross-sectional outline of the flume at that point. A sleeve 10 is mounted approximately in the middle of the shaft so that a pendant vane will be suspended substantially in the middle of the flow of fluid through the flume. The sleeve is secured to the shaft by means of a set screw 11. A rotatable housing 12 is mounted on the sleeve 10. A plurality of ball or roller bearings 13 mounted between the sleeve 10 and the housing 12 permit free rotational movement of the housing 12 about the sleeve 10. A tube mounting body 14 is secured to the housing 12 by means of a pivot pin 15, and a pair of set screws 16 mounted on either side of the pin 15 maintains the body in predetermined position on the housing 12. By adjusting the set screws, the body 14 may be slightly tilted in relation to the housing 12 to permit a zero setting correction on the indicator. The body 14 includes upstanding end portions 17 which are arranged to hold a pair of spirit level tubes 20 and 21 so that the indicating bubble is maintained in full view when the device is in operation.

Mounted on the housing 12 and suspended downwardly therefrom is a vane support 25. The vane support is so connected to housing 12 that the movement of the support 25 directly moves the housing 12. A hinge 26 is secured to the lower end of the mount 25 and a pendant vane mount or arm 27 is secured thereto. An elongated conical pendant vane 28 is rigidly mounted on the arm 27. The vane is substantially in accordance with measurements set forth in co-pending application Serial No. 451,582, with the altitude proportionately increased.

In operation of the device, where the measuring instrument is mounted on an open flume for measuring water running through the flume, the shaft 1 is mounted at a point in the flume having known cross-sectional dimensions. The instrument is so mounted on the flume that when there is no water touching the pendant vane a bubble 22, in tube 20, is at the extreme right end of the tube 20 or at the zero mark. The set screws 16 are utilized to adjust the body 14 so that the bubble is at the zero mark when no water is touching the pendant vane. The spirit level tubes are pre-calibrated for the flow of water through the known cross section of the flume. On introducing water through the flume, the pendant vane 28 is moved downstream, indicated by the arrow, to a point equivalent to the specific force for that flow. The hinge 26 permits the vane to fluctuate in response to minor deviations of the main flow such as planning, buoyancy, etc. The main force of the flow of water, however, on the pendant vane moves the arm 25 through an arc which is proportional to the flow of water in the flume or, in other words, proportional to the movement of the vane 28. As the arm 25 moves, the housing 14 moves, likewise, through an arc and the bubble 22 moves along the tube 20 to the point which indicates the movement of the housing 14 and is proportional to the flow of fluid in the flume. If the flow in the flume is greater than the calibration of tube 20, the bubble 22 moves behind the wall 17 out of sight, while a bubble in tube 21 appears on its scale. The tubes 21 and 22 are merely divided from a single long tube for convenience, and to prevent the use of an overly long spirit level tube. Once a bubble in one of the tubes has reached its indicating point, minor variations such as waves, debris hitting the pendant vane, surges in flow, and the like may move the vane 28 and the arm 25 to rock the body 12. Such rocking is substantially indiscernible by movement of the bubble. The variations cause movement or vibration of the vane and an actual rocking of the body but since there is no progressive tilting movement of the tubes, the visible bubble will remain substantially immobile indicating only the main force on the pendant vane. As the flow of water is increased, however, the pendant vane 28 progressively moves in an arcuate course downstream and the pendant mount arm 25, likewise, moves in an arcuate course downstream, which progressively tilts the body 14 and the bubble in the tube moves toward a higher indicated flow. Once the pendant vane reaches substantially the position directly due to the force of the quantity of water flowing, the bubble showing in the particular tube will indicate the correct flow at that quantity regardless of the extraneous fluctuations.

The use of the two spirit level tubes mounted in side-by-side relation reduces the overall requirement of length of the tube required to provide a readable calibrated scale. A single tube, for example 20, could be utilized with the device, but the number of necessary calibrations to cover the range desired would so reduce the distance between them as to substantially reduce the accuracy of the reading. On the other hand, it is possible to utilize two or three or more tubes depending on the movement of the motivating arm and on the accuracy desired. With the two tubes as illustrated, sufficient accuracy is obtained for measuring the flow of water in irrigation ditches for most purposes.

The illustration of Fig. 4 shows the relative placement of the two tubes, which are substantial extensions of one another. The radius A on the right end of tube 20 represents the particular radius of curvature of the tube at that point. The radius of curvature of the tube changes along its length to the left end mark 20 or as indicated at radius C. The radius B of tube 21, however, is identical with the radius C of tube 20. The radius of curvature of tube 21 also then changes along its length to the left end or to radius of curvature D. In this manner, a long tube may actually be divided and the two short tubes used. If three tubes are desired, the third tube will be placed along side the other two tubes, and the point of its lowest number (right end of the tube) would have a radius of curvature equal to the radius of curvature D of tube 21. The radius of curvature of the third tube will then change along its length to its opposite end.

The indicating instrument of the present invention has been illustrated in connection with a pendant vane for measuring the flow of water along an irrigation ditch; it is obvious, however, that the device could be utilized in any conduit measuring the flow of fluids in which the force of the fluids will move the pendant vane a specific distance in proportion to the force of the flow in the conduit. The spirit level indicating meter may be utilized with any instrument in which an arm rotates about an axis in response to the movement of a motivated member. The movement of this arm may be utilized to move the spirit level tube through an arc of rotation so the bubble in the tube indicates the movement of the tube. The indicating spirit level tubes are useful in any type of measuring instrument where a mechanical motion is utilized to move an indicating member along a calibrated scale. The tubes must be precalibrated to correspond to the force being measured. The construction of the spirit level tube is such that minor variations or rocking the the motivating arm do not move the bubble, and therefore, very accurate measurement may be made.

The spirit level provides an excellent visual indicating mechanism since the bubble may be made visible under various conditions by varying the color of the solution in the spirit level. Also, the device may be made so as to motivate a recording device by known means. For example, an electric eye may be used to pick up the position of the bubble and the image recorded on a chart.

In a normal operation of the indicating meter, an alcohol may be used the the liquid in the spirit level tubes. The alcohol medium is useful over a very wide range of temperatures, and since the viscosity of the alcohol does not change to any substantial degree, the accuracy of the device will remain substantially the same throughout a substantial temperature range. At elevated temperatures, the bubble may move slightly more in response to the rocking of the body than at lower temperatures. At lower temperatures, however, the slightly higher viscosity of the alcohol further reduces such fluctuations and any undue movement of the bubble is practically indiscernible. Under specific conditions it may be desired to utilize different liquids in the spirit level tube, but the operation of the device is substantially the same.

While the invention has been described by reference to a specific device, there is no intent to limit the concept of the invention to the specific details so set forth except insofar as limited by the appended claims.

We claim:

1. In a fluid flow meter having a vane and a pivoted vane supporting arm which is arranged to be progressively swung through an arc about its pivot in response to variations of flow acting on the vane, a body mounted on said arm and swingable upon its pivot in response to movement of said arm, at least one arcuate bubble-containing elongated spirit level tube mounted on said body and swingable through an arc therewith, and said tube having a decreasing radius of curvature from one end to the other.

2. In a fluid flow meter having a vane and a pivoted vane supporting arm which is arranged to be progressively swung through an arc about its pivot in response to variations of flow acting on the vane, a body mounted on said arm and swingable upon its pivot in direct proportion to movement of said arm, at least one bubble-containing elongated spirit level tube mounted on said body and swingable through an arc therewith, and said tube having a progressively changing radius of curvature along the length thereof.

3. In a fluid flow meter having a pendant vane and a pivoted pendant vane supporting arm which is arranged to be progressively swung through an arc about its pivot in response to variations of flow acting on the vane, a body interconnected with said arm and swingable upon its pivot in direct proportion to movement of said arm, a plurality of bubble-containing elongated spirit level tubes mounted on said body and swingable through an arc therewith, said tubes having a progressively decreasing radius of curvature along the length thereof, and a plurality of graduations extending lengthwise of said tubes, said tubes being arranged with increasing graduations from one to the other whereby only one bubble is positioned in the graduations at a time.

4. In a fluid flow meter having a pendant vane and a pivoted pendant vane supporting arm which is arranged to be progrssively swung through an arc about its pivot in response to variations of flow acting on the vane, a body interconnected with said arm and swingable upon its pivot in direct proportion to movement of said arm, a pair of bubble-containing elongated spirit level tubes mounted on said body and swingable through an arc therewith, said tubes having a progressively decreasing radius of curvature along the length thereof, said tubes being mounted in side-by-side relation and arranged to provide a decreasing radius of curvature from one end of the first tube to the opposite end of said second tube so as to permit a single bubble to move along the tubes during rotation thereof, and a plurality of graduations extending lengthwise of said tubes providing a progressive scale from tube to tube for visually determining the position of the bubble in said spirit level tubes.

5. A fluid flow meter for measuring the flow of fluid in an open conduit comprising a shaft arranged to be mounted adjacent to and above the conduit, a vane support pivotally mounted on said shaft and arranged to swing through an arc, a pendant vane suspended from said vane support and arranged to extend into the conduit in contact with fluid therein, a body disposed adjacent said shaft and arranged out of contact with the fluid in the conduit, said vane support being interconnected with said body whereby swinging movement of said vane swings said body through an arc which is proportional to the arc through which said vane support is swung, and at least one arcuate bubble-containing spirit level tube mounted on said body and swingable through an arc therewith.

6. A flow meter according to claim 5 in which the shaft is mounted on the edges of the conduit and spanning the same, and said pendant vane is mounted substantially centerwise of the lateral extent of the conduit, and said body is mounted on said arm above said shaft.

References Cited in the file of this patent

UNITED STATES PATENTS

| 764,556 | Cable | July 12, 1904 |
| 1,888,737 | Richmond | Nov. 22, 1932 |
| 2,600,309 | MacDonald | June 10, 1952 |